United States Patent [19]

Meyer-Pittroff et al.

[11] 4,340,820
[45] Jul. 20, 1982

[54] APPARATUS AND METHOD FOR PARTIAL-LOAD OPERATION OF A COMBINED GAS AND STEAM TURBINE PLANT

[75] Inventors: Roland Meyer-Pittroff, Eckental; Bernard Becker, Mülheim; Hermann Finckh, Nuremberg, all of Fed. Rep. of Germany

[73] Assignee: Kraftwerk Union Aktiengesellschaft, Mülheim, Fed. Rep. of Germany

[21] Appl. No.: 205,297

[22] Filed: Nov. 10, 1980

[30] Foreign Application Priority Data

Nov. 9, 1979 [DE] Fed. Rep. of Germany ....... 2945404

[51] Int. Cl.³ .............................................. F02C 7/02
[52] U.S. Cl. ..................................... 290/40 R; 290/51
[58] Field of Search .............................. 290/4, 40, 51

[56] References Cited

U.S. PATENT DOCUMENTS

| | | | |
|---|---|---|---|
| 3,879,616 | 4/1975 | Baker et al. | 290/40 R |
| 4,032,793 | 6/1977 | Uram | 290/40 C |
| 4,077,748 | 3/1978 | Pötz | 290/4 R X |
| 4,081,956 | 4/1978 | Baker et al. | 290/40 R X |
| 4,119,861 | 10/1978 | Gocho | 290/51 X |
| 4,133,567 | 1/1979 | McGann | 290/40 R |
| 4,201,924 | 5/1980 | Uram | 290/40 R |

OTHER PUBLICATIONS

In a journal "Energie und Technik", No. 24, 1972, Book 5, on pp. 147 to 152, in a paper entitled Combined Steam-Gas Turbine Processes.

Primary Examiner—J. V. Truhe
Assistant Examiner—W. E. Duncanson, Jr.
Attorney, Agent, or Firm—Herbert L. Lerner; Laurence A. Greenberg

[57] ABSTRACT

Apparatus and method for the partial load operation of a combined gas turbine and steam turbine plant, including a shaft being connected to the gas turbine and drivable at a given nominal speed of rotation, a first generator being connected to the shaft and electrically connectible to an electric network, a compressor being connected to the shaft and connected upstream of the gas turbine in gas flow direction, a heat exchanger having an output and a variable heat supply and being connected upstream of the gas turbine in gas flow direction, a steam generator for the steam turbine being connected downstream of the gas turbine in gas flow direction for receiving exhaust gases therefrom, a second generator being connected to the steam turbine and electrically connectible to the electric network for supplying given nominal power thereto along with the first generator, means for giving to the electric network and taking away from the network at least part of the nominal power if the shaft rotates at less than the nominal speed of rotation, and means for reducing the speed of rotation of the gas turbine for preventing a substantial drop in temperature at the output of the heat exchanger if the heat supply of the heat exchanger is reduced.

9 Claims, 3 Drawing Figures

APPARATUS AND METHOD FOR PARTIAL-LOAD OPERATION OF A COMBINED GAS AND STEAM TURBINE PLANT

The invention relates to an apparatus and a method for the partial-load operation of a combined gas-steam turbine plant, in which the gas and the steam turbine can be coupled by generators into an electric network; in which furthermore the exhaust gases of the gas turbine are fed to the steam generator of the steam turbine plant; and in which the gas turbine is preceded by a compressor arranged on the same shaft and by a heat exchanger provided with varying heat supply for heating the gas.

Circuits of combined gas and steam turbine plants are described, for instance, in the journal "Energie und Technik" No. 24, 1972, Book 5, on pages 147 to 152, in a paper entitled "Combined Steam-Gas Turbine Processes".

If such combined gas and steam turbine plants must be operated with partial load, the power of the subsequent steam process is reduced first since the gas turbine plant has a very poor efficiency for partial load.

It is accordingly an object of the invention to provide an apparatus and a method for partial-load operation of a combined gas and steam turbine plant, which overcomes the hereinafore-mentioned disadvantages of the heretofore-known devices and methods of this general type, and by means of which the combined gas-steam turbine plant can be operated without substantial impairment of the partial-load efficiency if the heat supply to the gas turbine cycle is reduced.

With the foregoing and other objects in view there is provided, in accordance with the invention, an apparatus for the partial load operation of a combined gas turbine and steam turbine plant, comprising a shaft being connected to the gas turbine and drivable at a given nominal speed of rotation, a first generator being connected to the shaft and electrically connectible to an electric network, a compressor being connected to the shaft and connected upstream of the gas turbine in gas flow direction, a heat exchanger having an output and a variable heat supply and being connected upstream of the gas turbine in gas flow direction, a steam generator for the steam turbine being connected downstream of the gas turbine in gas flow direction for receiving exhaust gases therefrom, a second generator being connected to the steam turbine and electrically connectible to the electric network for supplying given nominal power thereto along with the first generator, means for giving to the electric network and taking away from the network at least part of the nominal power if the shaft rotates at less than the nominal speed of rotation, and means for reducing the speed of rotation of the gas turbine for preventing a substantial drop in temperature at the output of the heat exchanger if the heat supply of the heat exchanger is reduced.

In accordance with another feature of the invention, the means for giving and taking power are connected to the first generator.

In accordance with a further feature of the invention, the means for giving and taking power includes an electric machine connected to the shaft.

In accordance with an added feature of the invention, there is provided a line connected from the heat exchanger to the steam generator bypassing the gas turbine, and a valve disposed in the bypass line.

In accordance with an additional feature of the invention, there is provided an openable coupling disposed in the shaft between the gas turbine and the compressor.

In accordance with yet another feature of the invention, there are provided frequency converter means connected between the first generator and the electric network for transmitting power therebetween at partial load.

In accordance with yet a further feature of the invention, there is provided another valve connected between the heat exchanger and the gas turbine, a circuit breaker connected between each of the generators and the electric network, and means for controlling opening and closing of the valves and circuit breakers in dependence upon the temperature at the output of the heat exchanger.

In accordance with a concomitant feature of the invention, there is provided another circuit breaker being connected between the frequency converter means and the electric network and being controlled by the controlling means.

With the foregoing and other objects in view, there is also provided a method which comprises giving to the electric network and taking away from the network at least part of the nominal power if the shaft rotates at less than the nominal speed of rotation, and reducing the speed of rotation of the gas turbine for preventing a substantial drop in temperature at the output of the heat exchanger if the heat supply of the heat exchanger is reduced.

Other features which are considered as characteristic for the invention are set forth in the appended claims.

Although the invention is illustrated and described herein as embodied in an apparatus and method for partial-load operation of a combined gas and steam turbine plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
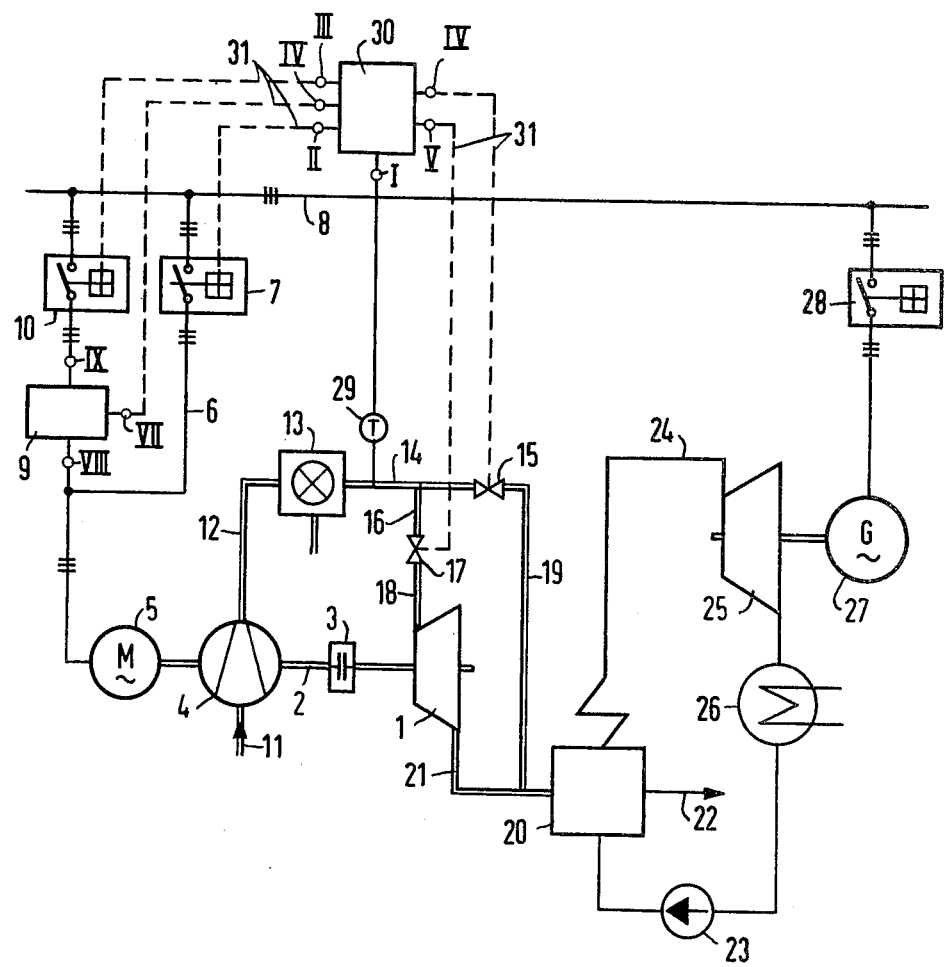
FIG. 1 is a schematic and block diagrammatic view of an embodiment of the invention.

Referring now to the figures of the drawing and first particularly to FIG. 1 thereof, it is seen that the gas turbine portion of the combined gas and steam turbine plant includes a gas turbine 1, the shaft 2 of which is connected through a coupling 3 to a compressor 4 and to a generator 5. According to FIG. 1, the generator 5 is connected through a line 6 and a circuit breaker 7 to an electric network 8. In addition, the generator 5 is likewise connected through a frequency converter 9 and a further circuit breaker 10 to the network 8. The frequency converter 9 is provided in many cases in order to allow asynchronous starting of the gas turbine plant. It has a terminal VIII which is connected to the generator 5, as well as a terminal IX which is connected to the load section of the circuit breaker 10.

The compressor 4 draws in air through a line 11, compresses it and takes it over a line 12 into a heat exchanger 13. This heat exchanger may, for instance, be a combustion chamber fired with oil or gas. It is also conceivable, however, to provide the heat exchanger of a fluidized-bed combustion chamber, a coal gasification plant or a solar energy plant here. The exit of the combustion chamber is connected by a line 14 to a valve 15, and by a line 16 to a valve 17. From the valve 17, a line 18 leads to the entrance of the turbine 1, and from the valve 15, a line 19 leads to the entrance of the steam generator 20 for the steam turbine plant. A line 21 further starts from the exit of the gas turbine 1 and likewise leads to the steam generator 20. After flowing through the steam generator 20 and, if applicable, through exhaust gas-heated feedwater preheaters, the air leaves the plant through a line 22. The steam generator 20 is preceded upstream by a feedwater pump 23 in a manner which is known per se but is not shown here. The steam generated in the steam generator 20 is transported over a line 24 to the steam turbine 25. The latter is followed, in a manner that is likewise known per se, by a condenser 26, the condensate of which returns to the feedwater pump 23. The steam turbine 25 is connected, as is the gas turbine 1, to a generator which is connected through a circuit breaker 28 to the network 8, in this case to generator 27.

A temperature measuring device 29, which is connected to the terminal I of a control device 30, is further connected to the output of the heat exchanger 13. The control device 30 also has other terminals II or VI which are connected by signal lines 31 to the valves 15 and 17, to the circuit breakers 7 and 10 and to the frequency converter 9. The frequency converter 9 has, in turn, a further terminal VII which is connected over one of the signal lines 31 to the terminal IV of the control device 30.

Figure 2:
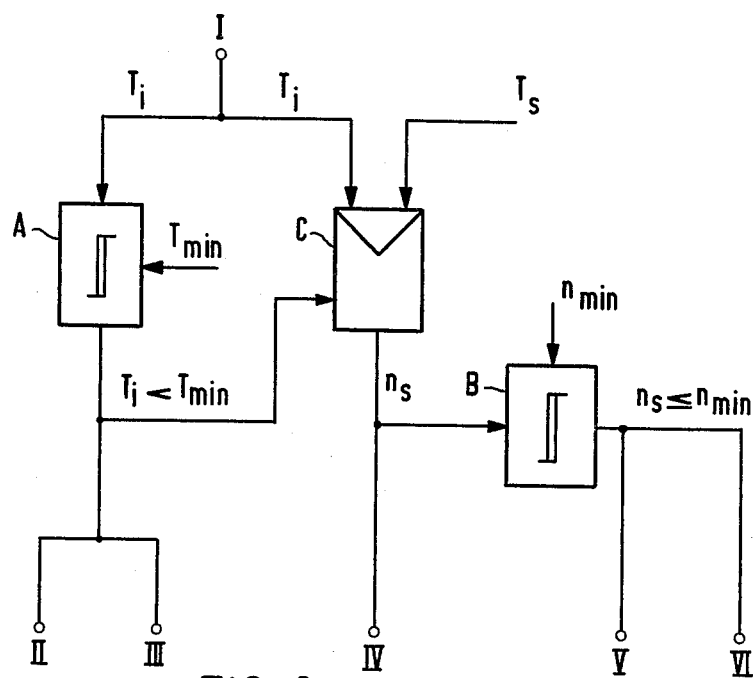
FIG. 2 is a schematic diagram showing the control device of FIG. 1 in detail.

As FIG. 2 shows, the control device 30 includes a limit setter or transmitter A for the temperature $T_i$ of the air leaving the heat exchanger 13, a further limit setter B for the desired speed of rotation $n_S$ of the shaft 2, and a controller C for the temperature $T_i$ of the air leaving the heat exchanger 13. The inputs of the limit setter A and the controller C are connected to the terminal I which is assigned to the temperature measuring device 29. The temperature measuring device 29 delivers a voltage to the terminal I which is proportional to the air temperature at the output of the heat exchanger 13. The output of the limit setter A, which is also connected to the controller C, presents a signal at the terminals II and III if the actual temperature $T_i$ of the air at the output of the heat exchanger 13 is lower than a fixed, predetermined minimum temperature $T_{min}$. This signal switches on the controller C. In addition, it closes the circuit breaker 10 with the correct phase through the signal line 31 connected to the terminal III and opens the circuit breaker 7 through the signal line 31 connected to the terminal II.

The setpoint value of the temperature controller C is the desired value $n_S$ of the speed of rotation of the shaft 2. The desired-value output of the temperature controller C appears on the one hand at the terminal IV and on the other hand at the input of the limit setter B. The output of this limit setter B is present at the terminals V and VI; the terminal V being connected by the control line 31 to the control loop of the valve 17, and the terminal VI by the control line 31 to the control loop of the valve 15. The terminal IV is connected by the control line 31 to the frequency converter 9. If the desired speed $n_S$ at the control variable output of the temperature controller C is lower than or equal to a fixed, predetermined minimum speed $n_{min}$, a signal is present at the output of the limit setter B and therefore at the terminals V and VI, which closes the valve 17 and opens the valve 15.

Figure 3:
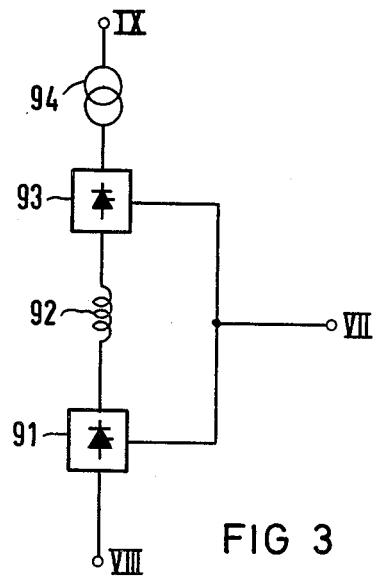
FIG. 3 is a schematic diagram showing the frequency converter of FIG. 1 in detail.

As shown in FIG. 3, the frequency converter 9 includes a rectifier 91, an intermediate-link smoothing choke 92 as well as a further controlled rectifier 93 with a transformer 94. The output of the transformer 94 is connected to the terminal IX, and its input is connected to the cathode of the controlled rectifier 93. The anode of the controlled rectifier 93 is connected through the choke 92 to the cathode of the controlled rectifier 91, and the anode of the rectifier 91 is connected to the terminal VIII. The control leads of the two controlled rectifiers 91 and 93 are connected to the terminal VII.

The controlled rectifier 91 can act as a pure rectifier, which rectifies the current delivered by the generator 5 with the correct timing according to the prevailing speed $n_S$ of the generator 5 and passes it to the controlled rectifier 93 which in this case acts as an inverter with the proper timing according to the prevailing speed $n_S$ of the generator 5. The operation of the two rectifiers 91 and 93 as rectifier and inverter is reversible as a function of the direction of the current flowing through the intermediate-link smoothing choke 92.

At full load of the gas turbine plant, the valve 15 is closed and the valve 17 is opened. The bypass of the gas turbine 1 leading through the lines 14 and 19 is therefore interrupted. Furthermore, the generator 5 is connected via the line 6 and the circuit breaker 7 to the network 8, so that it can give the net or useful power output of the gas turbine plant to the network 8 without loss.

If the gas turbine plant is now to be operated with partial load, the heat supply fed to the heat exchanger 13 is reduced and the temperature $T_i$ at the exit of the heat exchanger 13 is thereby reduced because of the contant mass flow conveyed by the compressor 4. If this temperature falls below a given settable value $T_S$ which also depends on the permissible power of the frequency converter 9, the control unit 30 causes the circuit breaker 7 to open, and closes circuit breaker 10. In addition, the speed $n_S$ of rotation of the shaft 2 and therefore the compressor mass flow are reduced by an appropriate control of the frequency converter 9. This reduction is carried so far that the temperature $T_i$ at the output of the heat exchanger 13 again rises to the desired or optimal temperature $T_S$. In that case, a higher gas temperature results at the output of the gas turbine than in the desired or optimal case. The reason for this is that the pressure ratio between entrance and exit of the gas turbine 1 is smaller because of the reduced speed of rotation, and the gas therefore expands less and is therefore cooled down less.

The result is that air with high temperature flows into the steam generator 20 even if the thermal output of the gas turbine plant is reduced, so that at reduced speed, the output power in the gas turbine plant as well as the output power in the steam turbine plant are generated at high steam pressure and high steam temperature but with a reduced quantity of live steam.

With further decreasing heat supply in the heat exchanger 13, the speed of rotation of the gas turbine and therefore the output power of the gas turbine plant is reduced until power is no longer given to the network 8 by the generator 5. Then, only the steam turbine 25 still supplies power to the network 8 from the generator 27. The thermal output produced in the heat exchanger 13 covers the losses of the compressor 4 and the gas turbine 1 and otherwise heats the steam generator 20 of the steam turbine process.

With further declining heat supply in the heat exchanger 13 and a corresponding reduction of the speed of rotation, the output power of the gas turbine plant becomes negative, so that the generator 5 is controlled by the frequency converter so that it runs as a motor and compensates the negative output power of the gas turbine plant. The power taken from the network 8 is then partially fed back into the network by the generator 27, since air is compressed and heated up in the compressor, and thus the heat supply in the steam generator, and therefore the power output of the steam turbine 25, are increased.

An extremely low partial load can also be provided in the embodiment example in an advantageous manner by closing the valve 17 and opening the valve 15. Then the pressure in the combustion chamber drops considerably and the compressor 4 operates essentially as a blower. By switching off the gas turbine 1 by means of the coupling 3, idling losses are avoided, so that a small amount of power from the network through the frequency convert 9 is sufficient to feed the generator 5, which is now running as a motor.

Instead of feeding the generator 5 through a frequency converter, a further electric machine can also be coupled to the shaft 2, for instance. The further electric machine would be suitable to supply power into the network 8 independently of the speed, or to obtain it therefrom.

There are claimed:

1. Apparatus for the partial load operation of a combined gas turbine and steam turbine plant, comprising a shaft being connected to the gas turbine and drivable at a given nominal speed of rotation, a first generator being connected to said shaft and electrically connectible to an electric network, a compressor being connected to said shaft and connected upstream of the gas turbine in gas flow direction, a heat exchanger having an output and a variable heat supply and being connected upstream of the gas turbine in gas flow direction, a steam generator for the steam turbine being connected downstream of the gas turbine in gas flow direction for receiving exhaust gases therefrom, a second generator being connected to the steam turbine and electrically connectible to the electric network for supplying given nominal power thereto along with said first generator, means for giving to the electric network and taking away from the network at least part of said nominal power if said shaft rotates at less than said nominal speed of rotation, and means for reducing the speed of rotation of the gas turbine for preventing a substantial drop in temperature at said output of said heat exchanger if said heat supply of the heat exchanger is reduced.

2. Apparatus according to claim 1, wherein said means for giving and taking power are connected to said first generator.

3. Apparatus according to claim 1, wherein said means for giving and taking power includes an electric machine connected to said shaft.

4. Apparatus according to claim 1, including a line connected from said heat exchanger to said steam generator bypassing the gas turbine, and a valve disposed in said bypass line.

5. Apparatus according to claim 1, including an openable coupling disposed in said shaft between the gas turbine and said compressor.

6. Apparatus according to claim 1, including frequency converter means connected between said first generator and the electric network for transmitting power therebetween at partial load.

7. Apparatus according to claim 4, including another valve connected between said heat exchanger and the gas turbine, a circuit breaker connected between each of said generators and the electric network, and means for controlling opening and closing of said valves and circuit breakers in dependence upon the temperature at said output of said heat exchanger.

8. Apparatus according to claim 7, including frequency converter means connected between said first generator and the electric network for transmitting power therebetween at partial load, and another circuit breaker being connected between said frequency converter means and the electric network and being controlled by said controlling means.

9. Method for the partial load operation of a combined gas turbine and steam turbine plant, having a shaft being connected to the gas turbine and drivable at a given nominal speed of rotation, a first generator being connected to said shaft and electrically connectible to an electric network, a compressor being connected to said shaft and connected upstream of the gas turbine in gas flow direction, a heat exchanger having an output and a variable heat supply and being connected upstream of the gas turbine in gas flow direction, a steam generator for the steam turbine being connected downstream of the gas turbine in gas flow direction for receiving exhaust gases therefrom, and a second generator being connected to the steam turbine and electrically connectible to the electric network for supplying given nominal power thereto along with said first generator, which comprises giving to the electric network and taking away from the network at least part of said nominal power if said shaft rotates at less than said nominal speed of rotation, and reducing the speed of rotation of the gas turbine for preventing a substantial drop in temperature at said output of said heat exchanger if said heat supply of the heat exchanger is reduced.

* * * * *